United States Patent
Jiang

[11] Patent Number: 5,958,000
[45] Date of Patent: *Sep. 28, 1999

[54] TWO-BIT BOOTH MULTIPLIER WITH REDUCED DATA PATH WIDTH

[75] Inventor: Shao-kun Jiang, San Jose, Calif.

[73] Assignee: Samsung Electronics, Co. Ltd., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/751,525

[22] Filed: Nov. 15, 1996

[51] Int. Cl.[6] ................................................. G06F 7/52
[52] U.S. Cl. .......................................... 708/627; 708/632
[58] Field of Search ............................ 364/756.01, 757, 364/759, 760.01, 760.04, 760.05; 708/620, 625, 627, 628, 631, 632

[56] References Cited

U.S. PATENT DOCUMENTS

| | | | |
|---|---|---|---|
| 4,546,446 | 10/1985 | Machida | 364/759 |
| 4,589,086 | 5/1986 | Beifuss et al. | 364/760.01 |
| 4,679,165 | 7/1987 | Rainer | 364/760.05 |
| 4,853,887 | 8/1989 | Jutand et al. | 364/757 X |
| 5,646,874 | 7/1997 | Beyme | 364/736.02 |

*Primary Examiner*—Chuong Dinh Ngo
*Attorney, Agent, or Firm*—Skjerven, Morrill, MacPherson, Franklin & Friel, LLP; Ken J. Koestner

[57] ABSTRACT

A two-bit Booth multiplier circuit performs two-bit multiplication iterations using a single adder while retaining the same data path width and the multiplicand multiples of a single-bit Booth multiplier circuit. The two-bit Booth multiplier circuit halves the number of multiplier iterations of a single-bit multiplier. A multiplier circuit includes an adder having a first input terminal, a second input terminal, and an output terminal and a plurality of shift registers. The registers include a multiplicand register having an output terminal connected to the first input terminal of the adder, a temporary shift register having an output terminal connected to the second input terminal of the adder and having an input terminal connected to the output terminal of the adder, and a multiplier shift register having an input terminal connected to the output terminal of the adder and the multiplier shift register and having an output terminal. The multiplier circuit further includes a shift logic connected between the adder and the plurality of shift registers and a Booth logic circuit having an input terminal connected to the output terminal of the multiplier shift register and having an output terminal connected to the shift logic. The Booth logic circuit controls a two-bit Booth multiplier operation designating multiplicand partial product operations including +0 and ±x partial product operations and implementing ±2x partial product operations using the ±x multiplicand partial product operations while shifting data from the temporary shift register one bit right on application to the adder.

20 Claims, 5 Drawing Sheets

TWO-BIT BOOTH MULTIPLIER WITH REDUCED DATA PATH WIDTH

BACKGROUND OF THE INVENTION

1. Field of the Invention

The present invention relates to computer arithmetic circuits and operating methods. More specifically, the invention relates to a two-bit Booth multiplier circuit.

2. Description of the Related Art

FIG. 1, which is labeled prior art, illustrates a block diagram of a simple Booth multiplier 100 for signed integers. The numbers $x=x_{n-1}x_{n-2}\ldots x_0$ and $y=y_{n-1}Y_{n-2}\ldots y_0$ are respectively placed into register X 102 and register Y 104 for multiplication by the Booth multiplier 100 and a register P 106 is initially set to zero. A multiplication operation is executed in a sequence of two-part iterations. In a first part, register Y 104 containing bits $Y_{n-1}y_{n-2}\ldots y_0$ is added to register P 106 when the least significant bit of register X 102 is 1. Register P 106 is left unchanged when the least significant bit of register X 102 is 0. In a second part, register P 106 and register X 102 are shifted right with the low-order bit of register P 106 moving to the high-order bit of register X 102 and the low-order bit of register X 102 discarded. After n iterations, the multiplication product is held in register P 106 and register X 102 with the least-significant bits held in register X 102.

Booth recoding in a Booth multiplier circuit is useful for implementing a multiplication operation that operates on both on unsigned and signed numbers. For unsigned multiplication, the unsigned numbers are converted to signed numbers by appending a zero value bit to the left of the most significant bit $(x_{n-1})$ of a number $x=X_{n-1}\,x_{n-2}\ldots x_0$. Accordingly, a set of rules are defined for implementing a Booth multiplier 100 assuming that register X 102 initially holds a number $x=x_{n-1}x_{n-2}\ldots x_0$ and a zero value bit is appended to the right of the least significant bit $(x_0)$ of the number $x=x_{n-1}\,x_{n-2}\ldots x_0$ for a Booth encoding. The rules applied to the Booth multiplier where $x_{i-1}$ is initially 0 and the ith multiply iteration the low-order bit of register X 102 is $x_i$, are as follows:

(1) If $x_i=0$ and $x_{i-1}=0$, then add 0 to register P 106.

(2) If $x_i=0$ and $x_{i-1}=1$, then add register Y 104 to register P 106.

(3) If $x_1=1$ and $x_{i-1}=0$, then subtract register Y 104 from register P 106.

(4) If $x_i=1$ and $x_{i-1}=1$, then add 0 to register P 106.

A simple technique for implementing the rules for the Booth multiplier 100 involves extending the register X 102 one bit to the right to define a new bit $x_{-1}$. Two's complement multiplication is implemented by taking into consideration the sign of the value in register P 106 while the register P 106 is shifted right and saving the most recently shifted bit of register X 102 for usage in deciding whether to add or subtract register Y 104 from register P 106.

Various considerations are taken into account in the design of a multiplier circuit. For example, if operating speed is paramount, a multiplier circuit typically includes a plurality of adders forming a multiplier array. A full-range multiplier array generally includes an adder for each of the bits in a multiplicand. Unfortunately, a multiplier circuit having a plurality of adders requires a large circuit area.

In an implementation of a multiplier where the design takes circuit area considerations into account, a single adder may be used under control of a state machine or software to perform a multiply operation in a sequence of iterations.

What is needed is a multiplier circuit and operating method that increases operating speed while retaining the compact circuit size of a single-multiplier iterative multiplication circuit.

SUMMARY OF THE INVENTION

In accordance with the present invention, a two-bit Booth multiplier circuit performs two-bit multiplication iterations using a single adder while retaining the same data path width of a single-bit Booth multiplier circuit. The two-bit Booth multiplier circuit halves the number of multiplier iterations of a single-bit multiplier.

In accordance with an embodiment of the present invention, a multiplier circuit includes an adder having a first input terminal, a second input terminal, and an output terminal and a plurality of shift registers. The registers include a multiplicand register having an output terminal connected to the first input terminal of the adder, a temporary shift register having an output terminal connected to the second input terminal of the adder and having an input terminal connected to the output terminal of the adder, and a multiplier shift register having an input terminal connected to the output terminal of the adder and having an output terminal. The multiplier circuit further includes a shift logic connected between the adder and the plurality of shift registers and a Booth logic circuit having an input terminal connected to the output terminal of the multiplier shift register and having an output terminal connected to the shift logic. The Booth logic circuit controls a two-bit Booth multiplier operation designating multiplicand partial product operations including +0 and ±x partial product operations and implementing ±2x partial product operations using the ±x multiplicand partial product operations while shifting data from the temporary shift register one bit right on application to the adder.

Many advantages are achieved by the described Booth multiplier circuit and operating method. One advantage is that the described Booth multiplier circuit has a reduced circuit size and reduced complexity. It is advantageous that special handling of ±2x partial product operations reduces the data path of the Booth multiplier. Advantageously, the Booth multiplier circuit only utilizes ±x and +0 partial product operations rather than +0, ±2x and ±x partial product operations of other two-bit Booth multiplier embodiments. The reduced number of partial product operations advantageously allows the selection of the partial product using a three-to-one multiplexer, rather than a five-to-one multiplexer. Usage of the three-to-one multiplexer improves the operating speed of the Booth multiplier and reduces loading on the Booth multiplier. The two-bit shift operation advantageously halves the number of iterations that are used for a Booth multiply operation using a single adder.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
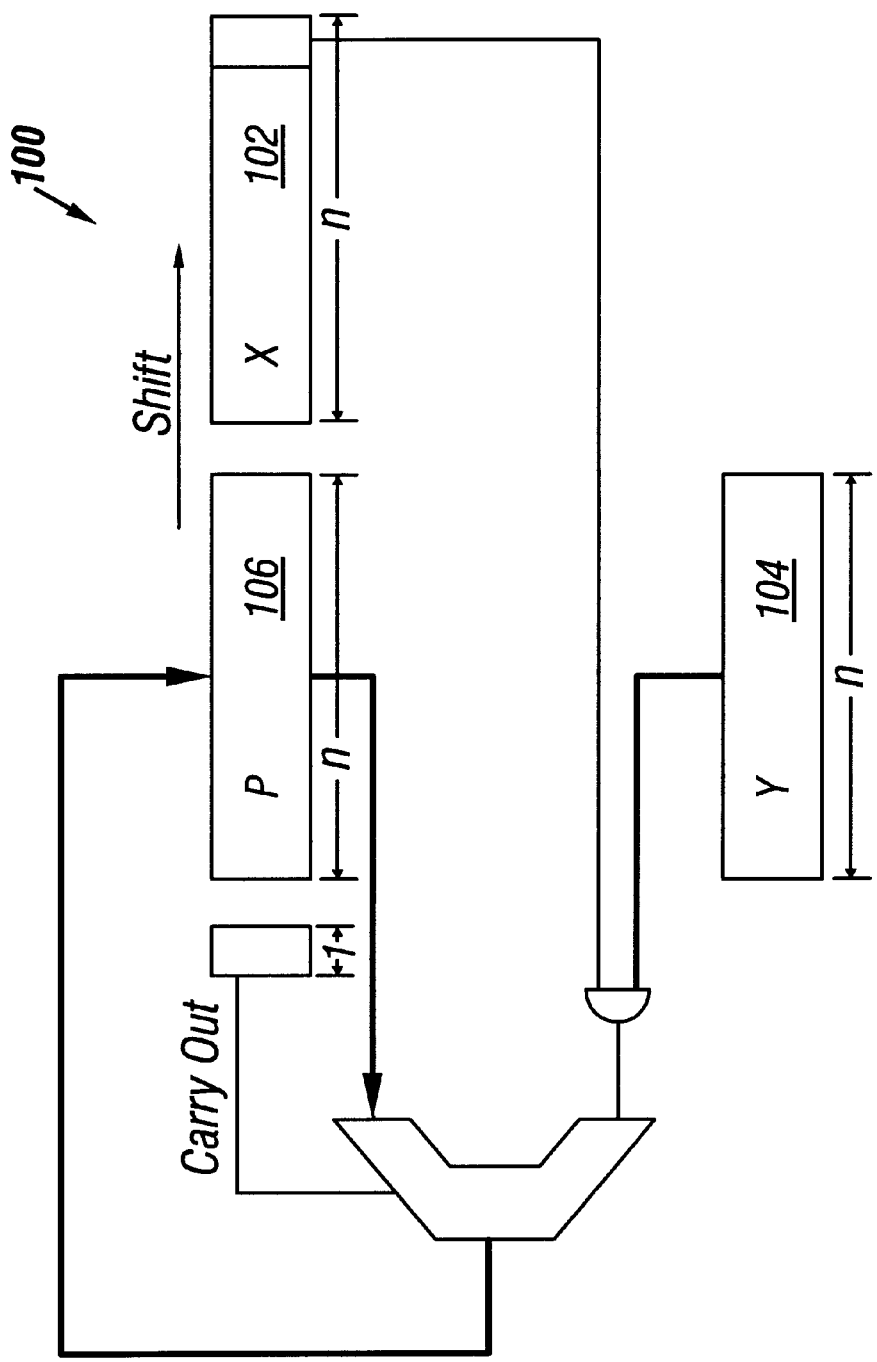
FIG. 1, which is labeled prior art, illustrates a block diagram of a simple Booth multiplier for integer numbers.
Figure 2:
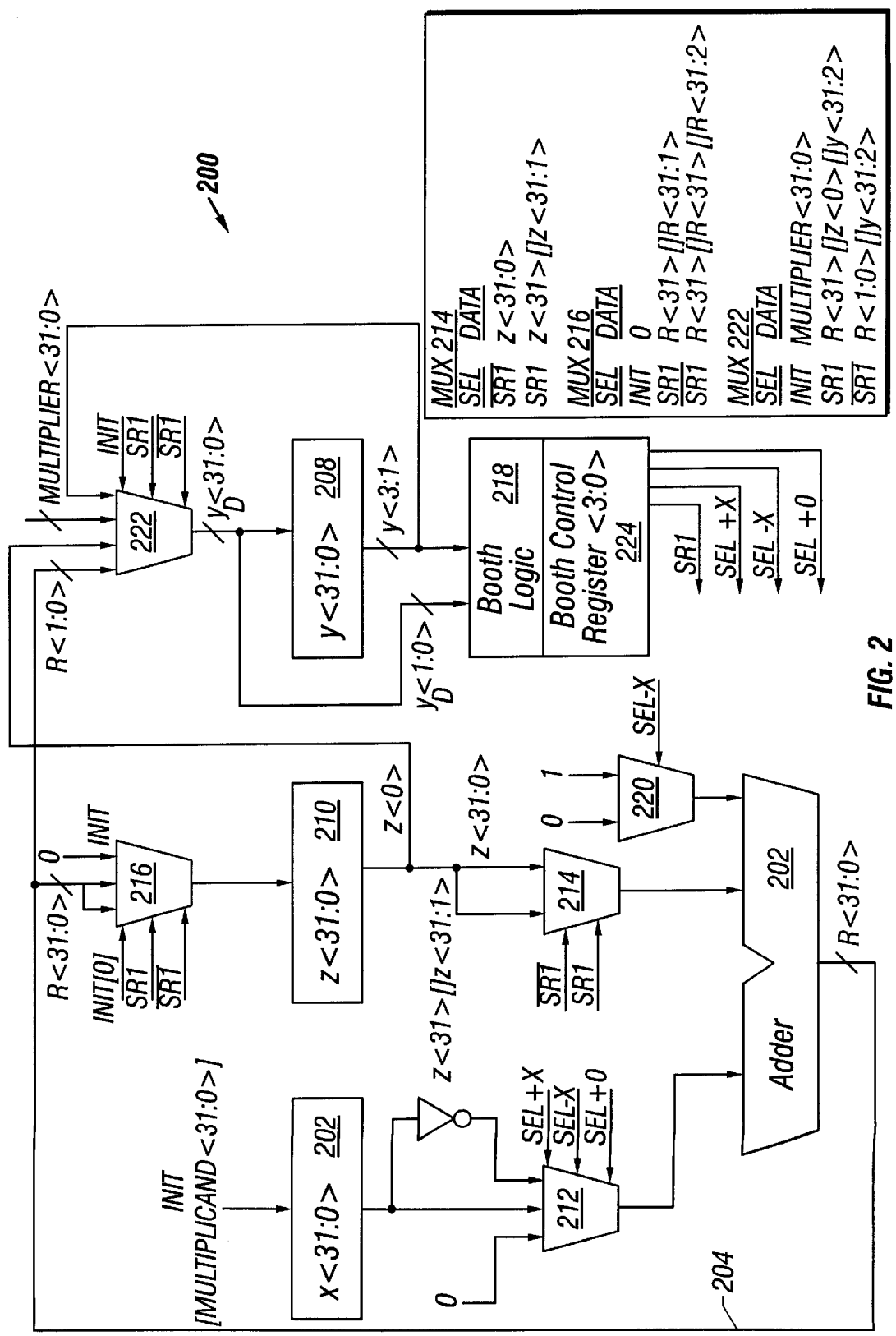
FIG. 2 is a schematic block diagram showing a two-bit Booth multiplier circuit in accordance with an embodiment of the present invention.

Referring to FIG. 2, a schematic block diagram illustrates an embodiment of a two-bit Booth multiplier circuit 200 which performs two-bit multiplication iterations using a single adder 202, while conserving width of a data path 204. In a two-bit Booth multiplier two bits are retired during each iteration, in comparison to one bit that is retired by a conventional Booth multiplier, so that only half the iterations of a conventional Booth multiplier are performed. The adder 202 generates a 32-bit result R<31:0> which forms the 32-bit data path 204. The two-bit Booth multiplier circuit 200 performs a multiplication operation of a datum held in a multiplicand register x<31:0> 206 and a datum held in two shift registers including a temporary register z<31:0> 210 and a multiplier shift register y<31:0> 208. Although the two-bit Booth multiplier circuit 200 is illustratively shown as a 32-bit multiplier circuit with a 32-bit multiplicand register x<31:0> 206 and a 32-bit multiplier shift register y<31:0> 208, other sizes of circuits may also be implemented including, but not limited to, 8-bit, 16-bit, 64-bit, 256-bit and other size circuits. Other embodiments may implement a multiplier size that is not a multiple of 2. The result of the multiplication operation is stored in the multiplier shift register y<31:0> 208 and a temporary shift register z<31:0> 210, where the temporary shift register z<31:0> 210 holds the most significant bits of a result R<63:0> and the multiplicand register x<31:0> 206 holds the least significant bits of the result R<63:0>.

The adder 202 is a 32-bit adder with a first input terminal connected to the multiplicand register x<31:0> 206 through a multiplicand multiplexer 212 and a second input terminal connected to the temporary shift register z<31:0> 210 through a result select multiplexer 214. The adder 202 has a third input terminal connected to a negative x multiplexer 220. The negative x multiplexer 220 has first and second input terminals for receiving logic 0 and logic 1 values under control of a select –x signal from the Booth logic circuit 218. The negative x multiplexer 220 is used to add a 1 to one's complemented data from the multiplicand register x<31:0> 206 to supply a two's complement number. The adder 202 has an output terminal that is connected to a result set multiplexer 216 supplying result data bits R<31:1> and connected to a multiplier multiplexer 222 supplying result data bits R<1:0>. Temporary data z<31:0> from the result set multiplexer 216 are selected by control signals from a Booth logic circuit 218 and written to the temporary shift register z<31:0> 210. Least significant result data bits R<1:0> from the adder 202 are also connected to an input terminal of a multiplier multiplexer 222. The multiplier multiplexer 222 also has an input terminal connected to the temporary shift register z<31:0> 210 to receive the least significant bit z<0>. Control of each multiplication iteration is performed by a Booth logic circuit 218. The Booth logic circuit 218 registers the control signals internally in a register 224. The Booth logic circuit 218 is connected to the multiplier shift register y<31:0> 208 and to the multiplier multiplexer 222 to receive data which directs the state of the Booth logic circuit 218 and is applied to control terminals of the multiplicand multiplexer 212, multiplier multiplexer 222, and result select multiplexer 214 for controlling operation of the Booth multiplier 200. The Booth logic circuit 218 is connected to the multiplier shift register y<31:0> 208 to receive three bits y<3:1> and connected to the multiplier multiplexer 222 to receive two bits $y_D$<1:0> concatenated with a logic 0 bit for initial Booth encoding, where $y_D$<31:0> is a multiplier data word prior to shifting by the multiplier shift register y<31:0> 208.

The Booth logic circuit 218 receives the three bits y<3:1> and the two bits $y_D$<1:0> concatenated with a logic "0" to control the grouping by the Booth multiplier 200 of the multiplier y<31:0> into two-bit groups. The three bits received by the Booth logic circuit 218 include two bits of the multiplier signal y and a most significant bit of a lower order group of bits. In the first iteration of the Booth multiplier 200, the three control bits used to control the Booth logic circuit 218 includes multiplicand data bits $y_D$<1:0> concatenated with a logic "0". For subsequent iterations of the Booth multiplier 200, the three control bits for controlling the Booth logic circuit 218 are the three multiplier register bits y<3:1>. In the illustrative embodiment of the Booth multiplier 200, an assumption is made that the multiplier y<31:0> is loaded immediately preceding the first Booth iteration. Otherwise, the first Booth iteration is performed using input signals including two multiplier register bits y<1:0> concatenated with a logic "0".

The Booth logic circuit 218 includes a decoder (not shown) which decodes a two-bit input signal including Booth bit<1> and Booth bit<0>. The Booth bits <1:0> are selected from the two bits y<3:2> and the two bits $y_D$<1:0> according to TABLE I, as follows:

TABLE I

| Booth bit<1> | Booth bit<0> | MS bit of Lower Order Group | Partial Product | select 0 | select +x | select –x | Shift Right 1 |
|---|---|---|---|---|---|---|---|
| 0 | 0 | 0 | +0 | 1 | 0 | 0 | 0 |
| 0 | 0 | 1 | +x | 0 | 1 | 0 | 0 |
| 0 | 1 | 0 | +x | 0 | 1 | 0 | 0 |
| 0 | 1 | 1 | +2x | 0 | 1 | 0 | 1 |
| 1 | 0 | 0 | –2x | 0 | 0 | 1 | 1 |
| 1 | 0 | 1 | –x | 0 | 0 | 1 | 0 |
| 1 | 1 | 0 | –x | 0 | 0 | 1 | 0 |
| 1 | 1 | 1 | +0 | 1 | 0 | 0 | 0 |

TABLE I illustrates the partial product operation that is performed for each iteration of the two-bit Booth multiply operation. The partial product operation is selected from among the partial product operations including +0, ±x and ±2x. In one embodiment of a Booth multiplier circuit, the ±2x operation disadvantageously extends the data path one extra bit. For example, in the embodiment illustrated by FIG. 2, the ±2x operation generally increases the data path from 32 bits to 33 bits.

Extension of the data path is advantageously avoided by special handling of ±2x partial product operations. The +2x partial product operation is avoided by noting that the result of a +2x operation is an appending of a zero value bit to the least significant bit of the result from the adder 202 and a left shifting of the multiplicand x<31:0> by one bit position. Accordingly, the least significant bit of the accumulated partial product is the least significant bit of the right-shifted, two-bit accumulated partial product of the previous cycle so that one fewer bit is passed through the adder 202 for ±2x partial product operations without extending the data path 204 one extra bit.

The –2x partial product operation is avoided by noting that –2x is equal to 2 times –x, which is further the same as 2 times the quantity $\bar{\chi}+1$. Accordingly, the partial product −2x is equal to the quantity $\bar{\chi}+1$, shifted left by one bit. As a result, least significant bit handling is the same for the +2x partial product operation and the −2x partial product operation.

In summary, the adder 202 receives the input data x<31:0> from the multiplicand multiplexer 212 for the case of the +2x partial product operation. The adder 202 receives the input data −x<31:0> from the multiplicand multiplexer 212 and adds 1 directly to the adder 202 for the case of the −2x partial product operation. For the ±2x partial product operations, the least significant bit in the accumulated partial product is dropped. For the ±2x partial product operations, the adder 202 avoids the one-bit left shift operation that is used for the ±x partial product operations. In this manner, the Booth multiplier 200 maintains the same data width in the adder 202 for ±2x and ±x partial product operations. Advantageously, the multiplicand multiplexer 212, which generates the partial products for the Booth multiplier 200, only selects ±x and +0 partial product operations using a three-to-one multiplicand multiplexer 212 rather than +0, ±2x and ±x partial product operations requiring a five-to-one multiplexer.

The Booth logic circuit 218 generates control signals including the select 0, select +x, select −x, and the shift right 1 control signals. The select 0, select +x, and select −x signals are applied to the multiplicand multiplexer 212 to select the partial product operation applied to the adder 202, thereby determining whether the first input terminal of the adder 202 receives a zero data value, the x register value from the multiplicand register x<31:0> 206 or the negated x( $\bar{\chi}$) register value from the multiplicand register x<31:0> 206 via an inverter (one's complement circuit) 224. The select −x signal is applied to the adder 202 to selectively add 1. Adding 1 converts the one's complement of x<31:0> into two's complement form.

The shift right 1 signal is applied to the result set multiplexer 216 to select which data bits of the result data R<31:0> are written to the temporary shift register z<31:0> 210. Result data bits R<31:1> are connected to the input terminal of the result set multiplexer 216. When the shift right 1 signal is asserted, result data bit R<31>is written to the most significant bit z<31> of the temporary shift register z<31:0> 210 and result data bits R<31:1> are shifted right and written to bits z<30:0> of the temporary shift register z<31:0> 210. The shift right 1 signal is asserted to replace the ±2x partial product operations. When the shift right 1 signal is not asserted, result data bit R<31> is written to the most significant bit z<31> and to bit z<30> of the temporary shift register z<31:0> 210 and result data bits R<31:2> are shifted right two bits and written to bits z<29:0> of the temporary shift register z<31:0> 210. The two-bit shift operation advantageously halves the number of iterations that are used for a Booth multiply operation using a single adder.

The shift right 1 signal is applied to the result select multiplexer 214 to select which data bits of the temporary data z<31:0> from the temporary shift register z<31:0> 210 are loaded to the adder 202. Temporary data bits z<31:0> are connected to the input terminal of the result select multiplexer 214. When the shift right 1 signal is asserted, temporary data bit z<31> is loaded to the most significant bit of the z<31:0> input to the adder 202 and temporary data bits z<31:1> are shifted right and input to bits z<30:0> of the adder 202. When the shift right 1 signal is not asserted, temporary data bits z<31:0> are directly input to bits z<31:0> of the adder 202.

The shift right 1 signal is also applied to the multiplier multiplexer 222 to select which data bits of the result data R<31:0> and the temporary data z<31:0> are written to the multiplier shift register y<31:0> 208. Result data bits R<1:0> and temporary data bit z<0> are connected to the input terminal of the multiplier multiplexer 222. When the shift right 1 signal is asserted, result data bit R<0> is written to the most significant bit y<31>, temporary data bit z<0> is written to bit y<30>, and multiplier data bits y<31:2> are shifted right two positions and written to bits z<29:0> of multiplier shift register y<31:0> 208. The shift right 1 signal is asserted to replace the ±2x partial product operations. When the shift right 1 signal is not asserted, result data bits R<1:0> are written to the most significant bits z<31:30> of the multiplier shift register y<31:0> 208 and multiplier data bits y<31:2> are shifted right two positions and written to bits z<29:0> of multiplier shift register y<31:0> 208.

The ±2x partial product operations are replaced by applying ±x partial product operations to the first input terminal of the adder 202 and dividing the data applied to the second input data by two. Specifically, the shift right one bit signal, when asserted, is applied as a control signal to the result select multiplexer 214 which shifts the bits of z<31:0> right one position as the data word is directed to the adder 202. By shifting prior to the adder 202, the data path from the adder 202 to the registers Z<31:0> and y<31:0> is maintained at 32-bits in width, rather than the 33 bits which would generally be necessary for a 2-bit Booth multiplier.

When the sum is accumulated in the temporary shift register z<31:0> 210 and the multiplier shift register y<31:0> 208, data is shifted right only one bit when the shift right one bit signal is asserted in comparison to a two-bit shift when the shift right one bit signal is deasserted. The operation of shifting the temporary shift register z<31:0> 210 data right one bit advantageously allows the width of the data path 204 to be maintained at 32-bits.

To initialize the Booth multiplier circuit 200, a multiplicand x<31:0> is written to the multiplicand register x<31:0> 206. The initialization signal is also applied as a control signal to the result set multiplexer 216 and the multiplier multiplexer 222. The initialization signal causes the result set multiplexer 216 to initialize the temporary shift register z<31:0> 210 to a zero value. The initialization signal causes the multiplier multiplexer 222 to write a multiplier y<31:0> to the multiplier shift register y<31:0> 208. The initialization has a duration of two clock cycles.

Figure 3:
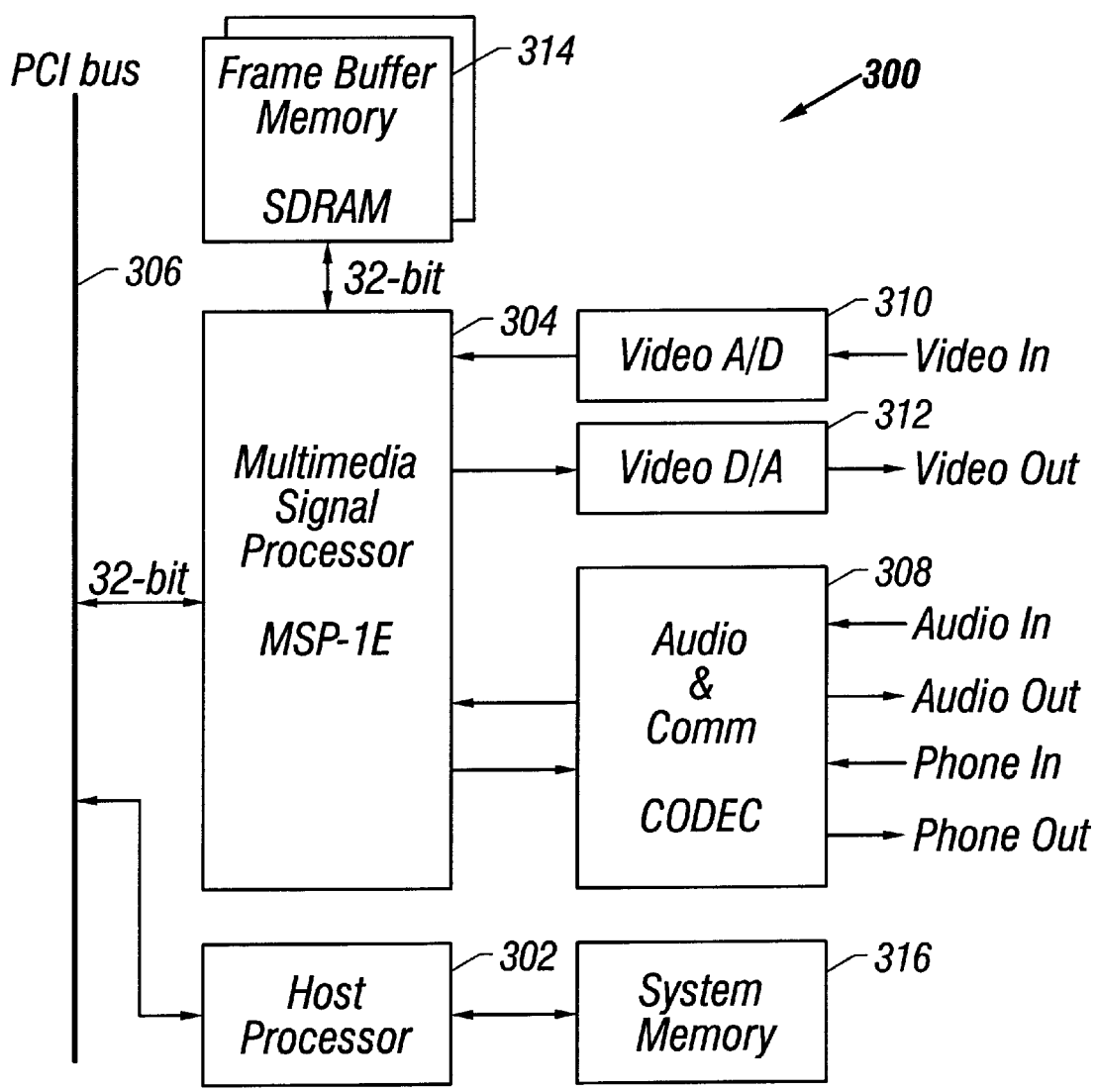
FIG. 3 is a high-level schematic block diagram illustrating a multimedia multiprocessor system in accordance with an embodiment of the present invention.

Referring to FIG. 3 a high-level schematic block diagram illustrates a multimedia multiprocessor system 300 which implements an illustrative technique for synchronizing audio and video frames in an MPEG presentation system. The multimedia multiprocessor system 300 includes a host processor 302 and a multimedia signal processor 304. A typical host processor 302 is an x86 processor such as a Pentium™ or Pentium Pro™ processor. The host processor 302 executes programs based on instructions and data held in a system memory 316. The host processor 302 communicates with the multimedia signal processor 304 via a system bus 306 such as a PCI bus. The multimedia signal processor 304 interfaces to various functional blocks such as an audio and communication CODEC 308, a video A/D converter 310, a video D/A converter 312, and a frame buffer SDRAM memory 314.

Figure 4:
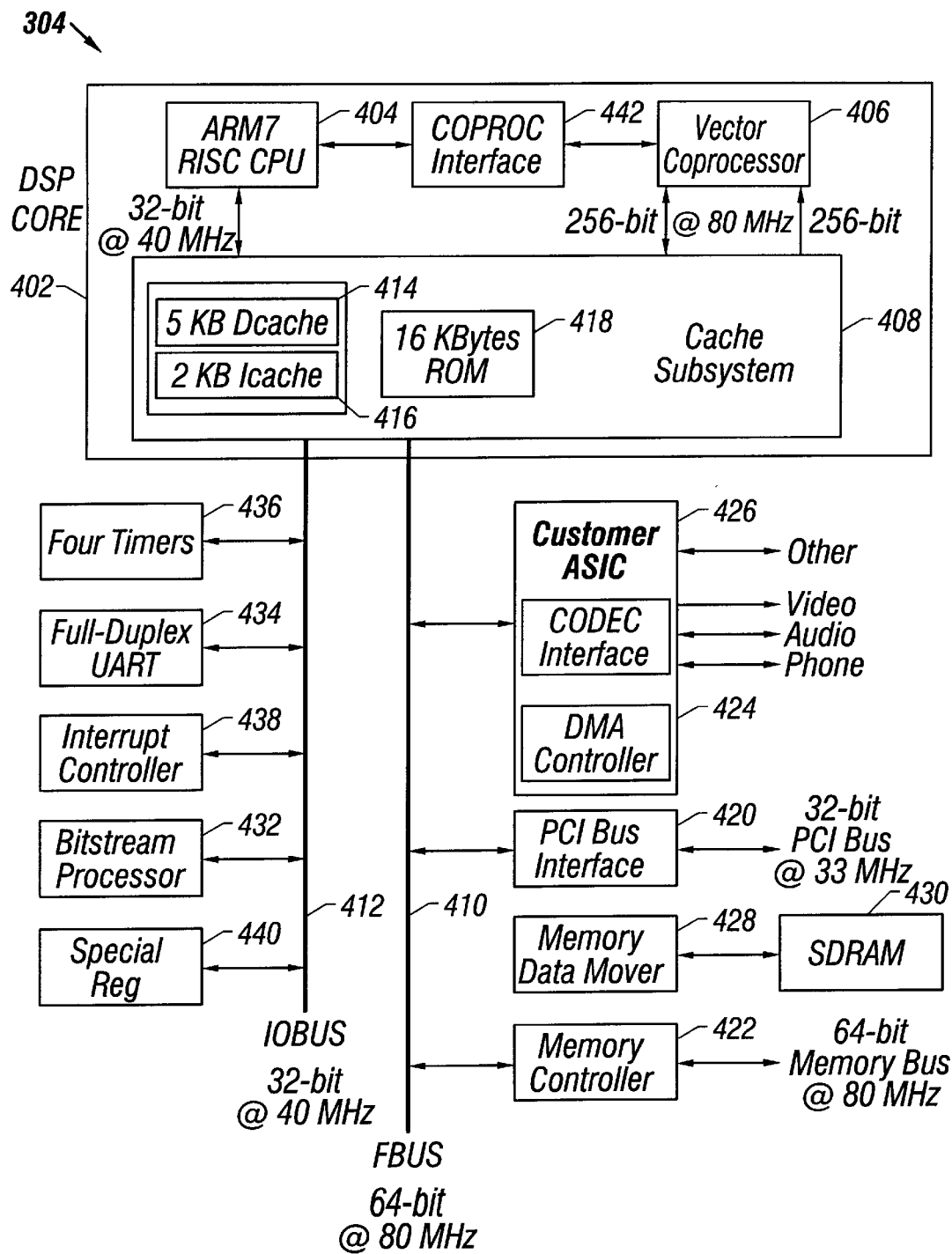
FIG. 4 is a schematic block diagram showing a multimedia signal processor included in the multimedia multiprocessor system illustrated in FIG. 3.

Referring to FIG. 4, a schematic block diagram shows the multimedia signal processor 304 within the multimedia multiprocessor system 300. The multimedia signal processor 304 includes a digital signal processor (DSP) core 402 which is connected to a plurality of multimedia interfaces.

The DSP core 402 is the computation engine of the multimedia signal processor 304 and includes a scalar processor 404, a vector processor 406, a cache subsystem 408, a fast bus (FBUS) 410, and an I/O bus 412. The scalar processor 404 is a scalar processor based on a 32-bit ARM7™ control processor which is designed and manufactured by ARM Limited, Great Britain, and performs general processing functions such as real-time operating system operations, interrupt and exception handling, input/output device management, communication with the host processor 302 and the like. In one embodiment, the scalar processor 404 operates at 40 MHz. The scalar processor 404 interfaces to the vector processor 406 through a coprocessor interface 442.

The multimedia signal processor 304 performs multiple various multimedia operations. One multimedia operation is audio decoding so that the scalar processor 404 and the vector processor 406, in combination with program codes which operate on the processors, form an audio processor (not shown).

Figure 5:
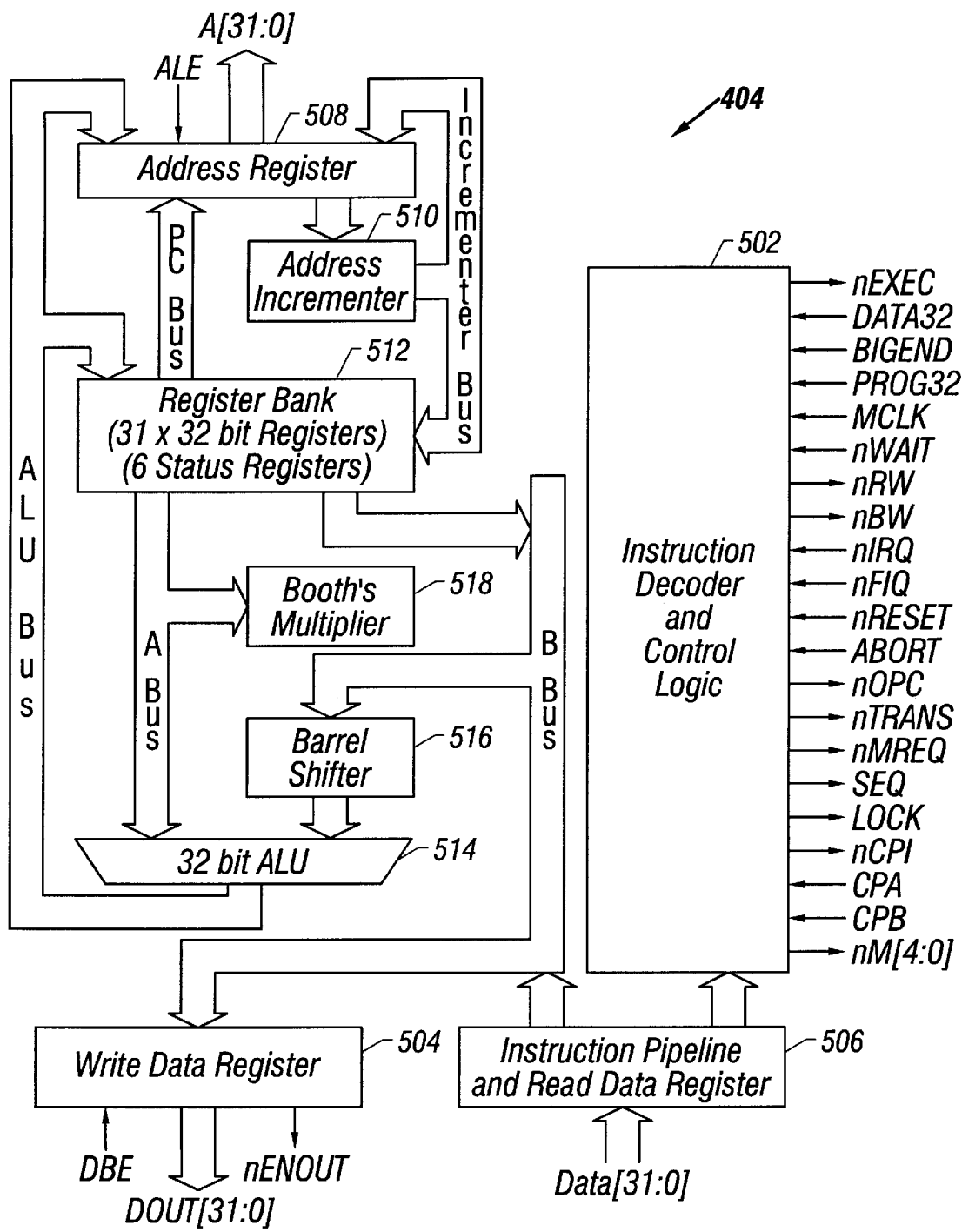
FIG. 5 is a schematic block diagram which illustrates a control processor in the multimedia multiprocessor system.

Referring to FIG. 5, a schematic block diagram illustrates the ARM7 scalar processor 404 which is controlled by an instruction decoder and control logic 502. The scalar processor 404 communicates with the cache subsystem 408 via a write data register 504 and an instruction pipeline and read data register 506. The scalar processor 404 includes an address register 508 and an address incrementer 510 for addressing data in a 31×32-bit register bank 512. The scalar processor 404 includes arithmetic logic such as a 32-bit ALU 514, a barrel shifter 516 and a Booth's multiplier 518. The coprocessor interface 442 is coupled directly to the instruction decoder and control logic 502 via nOPC, nCPI, CPA and CPB signal lines that communicate operation codes and instruction arguments between the scalar processor 404 and the vector processor 406 through the coprocessor interface 442.

Referring again to FIG. 4, the vector processor 406 is the digital signal processing engine of the multimedia signal processor 304. The vector processor 406 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The vector processor 406 supports vector arithmetic in which multiple data elements are operated upon in parallel, in the manner of a vector process, by a plurality of vector execution units. The vector processor 406 executes both scalar operations and combined vector-scalar operations. The multiple data elements of the vector processor 406 are packed in a 288-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle and most 288-bit vector operations are pipelined at a rate of one instruction per cycle. Load and store operations are overlapped with arithmetic operations and are executed independently by separate load and store circuits.

The cache subsystem 408 includes a data cache 414 (for example, 5KB), an instruction cache 416 (for example, 2KB), and a cache ROM 418 (for example, 16KB) and typically operates at the same speed as the vector processor 406 (80 MHz). In one embodiment, the cache subsystem 408 includes 1 Kbyte of instruction storage and 1 Kbyte of data storage for the scalar processor 404, 1 Kbyte of instruction storage and 4 Kbyte of data storage for the vector processor 406, and a shared 16 Kbyte of integrated instruction and data cache ROM for both the scalar processor 404 and the vector processor 406. The cache subsystem 408 interfaces to the scalar processor 404 through 32-bit data buses and interfaces to the vector processor 406 through 256-bit data buses. The cache ROM 418 includes uROM initialization software, self-test diagnostics software, various system management software, library routines and a cache for selected instructions and data constants. Specifically, the cache ROM 418 includes an instruction exception handler and input and output device interrupt handlers 0, 1, 2 and 3 for the scalar processor 404. The cache ROM 418 also includes a vector processor interrupt handler and a vector processor breakpoint exception handler which execute in the scalar processor 404.

The FBUS 410 interfaces to a plurality of FBUS peripherals including, for example, a 32-bit PCI bus interface 420, a 64-bit SDRAM memory controller 422, an 8-channel DMA controller 424, a customer ASIC logic block 426, and a memory data mover 428. The PCI bus interface 420 interfaces to the system bus 306 and operates, for example, at 33 MHz. The customer ASIC logic block 426 furnishes control logic for implementing custom functionality, as desired. The customer ASIC logic block 426, in one embodiment, supplies 10 Kgates including interfaces to various analog CODECs and customer-specific I/O devices. The memory data mover 428 transfers DMA data from the host processor 302 to SDRAM memory 430 which is local to the multimedia signal processor 304.

The I/O bus 412 interfaces to a plurality of I/O bus devices including, for example, a bit stream processor 432, a UART serial line 434, a timer circuit 436, an interrupt controller 438, and a special register 440. The bit stream processor 432 processes the video bit stream. The special register 440 is used for software-controlled initialization and interrupt handling.

While the invention has been described with reference to various embodiments, it will be understood that these embodiments are illustrative and that the scope of the invention is not limited to them. Many variations, modifications, additions and improvements of the embodiments described are possible. For example, the embodiments are described as a 32-bit Booth multiplier circuit. Many alternative data widths may be handled in other embodiments. In addition, other embodiments may include multiple adders with each of the adders servicing a plurality of bits in a data word. Each of the individual adders may incorporate the described Booth multiplier circuit and operating method.

What is claimed is:

1. A multiplier circuit for performing multiplication through manipulation of a plurality of signals, the plurality of signals including at least a multiplier, a multiplicand and a partial product, the multiplier circuit comprising:

an adder having a first input terminal, a second input terminal, and an output terminal;

a multiplicand register having an output terminal coupled to the first input terminal of the adder;

a temporary shift register having an output terminal coupled to the second input terminal of the adder and having an input terminal coupled to the output terminal of the adder;

a multiplier shift register having an input terminal coupled to receive least significant bits of the partial product from the output terminal of the adder, and the input terminal of the multiplier shift register coupled to receive the multiplier, the multiplier shift register having an output terminal;

a Booth logic circuit having an input terminal coupled to the output terminal of the multiplier shift register and having an output terminal;

a first switch coupled between the output terminal of the multiplicand register and the first input terminal of the adder and having a control terminal coupled to the output terminal of the Booth logic circuit, the control terminal selecting a signal applied to the adder from among a zero input signal, a plus multiplicand signal, and a minus multiplicand signal; and a second switch coupled between the temporary shift register output terminal and the second input terminal of the adder and having a control terminal coupled to the output terminal of the Booth logic circuit, the control terminal selecting a bit shift number determining the number of bits a temporary signal is shifted for application to the adder, the shift number being selected from a 0 bit shift and a one bit right shift.

2. A multiplier circuit according to claim 1 further comprising:

a third switch coupled between the output terminal of the adder and the input terminal of the temporary shift register and having a control terminal coupled to the output terminal of the Booth logic circuit, the control terminal selecting a bit shift number determining the number of bits a result signal from the adder is shifted for writing the result signal to the temporary shift register, the shift number being selected from a 1 bit right shift and a two bit right shift.

3. A multiplier circuit according to claim 1 further comprising:

a fourth switch coupled between the output terminal of the adder and the input terminal of the multiplier shift register and having a control terminal coupled to the output terminal of the Booth logic circuit, the control terminal selecting an input bit designator designating whether the most significant bits applied to the multiplier shift register include result signal bits from the adder or a result signal bit from the adder and a least significant bit of a signal in the temporary shift register.

4. A multiplier circuit according to claim 1 further comprising:

a third input terminal of the adder;

a fifth switch coupled to the third input terminal of the adder and having a control terminal coupled to the Booth logic circuit for selectively incrementing the adder by 0 or 1.

5. A multiplier circuit according to claim 1 further comprising:

a sixth switch coupled to the input terminal of the multiplier shift register and coupled to the input terminal of the temporary shift register for writing a multiplier value to the multiplier shift register and for writing a zero value to the temporary shift register on receipt of an initialize signal.

6. A processor including a multiplier circuit according to claim 1.

7. A multimedia system including a multiplier circuit according to claim 1.

8. A multiplier circuit according to claim 1 wherein:

the Booth logic circuit input terminal is coupled to the multiplier shift register to receive three bits of the multiplier including the most significant bit of a lower order group; and the Booth logic circuit generates a plurality of control signals based on the two bits of the multiplier and the most significant bit of the lower order group, the control signals including:

a select 0 signal;

a select positive multiplicand signal;

a select negative multiplicand signal; and a shift right one bit signal.

9. A multiplier circuit for performing multiplication through manipulation of a plurality of signals, the plurality of signals including at least a multiplier, a multiplicand and a partial product the multiplier circuit comprising:

an adder having a first input terminal, a second input terminal, and an output terminal;

a plurality of shift registers including:

a multiplicand register having an output terminal coupled to the first input terminal of the adder;

a temporary shift register having an output terminal coupled to the second input terminal of the adder and having an input terminal coupled to the output terminal of the adder; and a multiplier shift register having an input terminal coupled to receive least significant bits of the partial product from the output terminal of the adder, and the input terminal of the multiplier shift register coupled to receive a shifted version the multiplier, the multiplier shift register having an output terminal;

a shift logic coupled between the adder and the plurality of shift registers; and a Booth logic circuit having an input terminal coupled to the output terminal of the multiplier shift register and having an output terminal coupled to the shift logic, the Booth logic circuit controlling a two-bit Booth multiplier operation designating multiplicand partial product operations including +0 and ±x partial product operations and implementing ±2x partial product operations using the ±x multiplicand partial product operations while shifting data from the temporary shift register one bit right on application to the adder.

10. A multiplier circuit according to claim 9 wherein:

the Booth logic circuit input terminal is coupled to the multiplier shift register to receive two bits of the multiplier and to receive a most significant bit of a lower order group; and the Booth logic circuit generates a plurality of control signals based on the two bits of the multiplier and the most significant bit of the lower order group, the control signals including:

a select 0 signal;

a select positive multiplicand signal;

a select negative multiplicand signal; and a shift right one bit signal.

11. A multiplier circuit according to claim 9 wherein the shift logic includes:

a first switch coupled between the output terminal of the adder and the input terminal of the temporary shift register and having a control terminal coupled to the output terminal of the Booth logic circuit, the control terminal selecting a bit shift number determining the number of bits a result signal from the adder is shifted for writing the result signal to the temporary shift register, the shift number being selected from a 1 bit right shift and a two bit right shift.

12. A multiplier circuit according to claim 9 wherein the shift logic includes:

a second switch coupled between the output terminal of the adder and the input terminal of the multiplier shift register and having a control terminal coupled to the output terminal of the Booth logic circuit, the control terminal selecting an input bit designator designating whether the most significant bits applied to the multiplier shift register include result signal bits from the adder or a result signal bit from the adder and a least significant bit of a signal in the temporary shift register.

13. A multiplier circuit according to claim 9 further comprising:

a third input terminal of the adder;

a third switch coupled to the third input terminal of the adder and having a control terminal coupled to the Booth logic circuit for selectively incrementing the adder by 0 or 1.

14. A multiplier circuit according to claim 9 further comprising:

a fourth switch coupled to the input terminal of the multiplier shift register and coupled to the output terminal of the temporary shift register for writing a multiplier value to the multiplier shift register and for writing a zero value to the temporary shift register on receipt of an initialize signal.

15. A processor including a multiplier circuit according to claim 9.

16. A multimedia system including a multiplier circuit according to claim 9.

17. A method of multiplying integer numbers in a processor having an adder, a multiplicand register, a temporary register, a multiplier shift register, and a Booth logic circuit, the method comprising:

receiving least significant bits of a partial product in the multiplier shift register from the adder:

receiving a shifted version of a multiplier in the multiplier shift register;

testing two bits of data in the multiplier shift register and the most significant bit of a previous two-bit group to determine whether a partial product value of +0, ±x, or ±2x is designated;

if a partial product value of +0 is designated, adding a zero data to a temporary data in the temporary register and replacing the temporary register with the sum right shifted by two bits;

if a partial product value of +x is designated, adding a multiplicand data in the multiplicand register to the temporary data in the temporary register and replacing the temporary register with the sum right shifted by two bits;

if a partial product value of −x is designated, complementing the multiplicand data in the multiplicand register, incrementing the complemented multiplicand data by 1, and adding the complemented multiplicand data to the temporary data in the temporary register and replacing the temporary register with the sum right shifted by two bits;

if a partial product value of +2x is designated, shifting the temporary data in the temporary register right one bit and adding the multiplicand data in the multiplicand register to the shifted temporary data in the temporary register and replacing the temporary register with the sum right shifted by one bit;

if a partial product value of −2x is designated, shifting the temporary data in the temporary register right one bit, complementing the multiplicand data in the multiplicand register, incrementing the complemented multiplicand data by 1, and adding the complemented multiplicand data to the shifted temporary data in the temporary register and replacing the temporary register with the sum right shifted by one bit; and shifting data in the multiplier shift register, the multiplicand register and the temporary register two bits right, the low-order bits of the temporary register being moved into the high-order bits of the multiplier shift register and the low-order bits of the multiplier being discarded.

18. A multiplier circuit in a processor for performing the method according to claim 17.

19. A processor including a multiplier circuit in the processor for performing the method according to claim 17.

20. A multimedia system including a multiplier circuit in a processor for performing the method according to claim 17.

* * * * *